(12) United States Patent
de Haan et al.

(10) Patent No.: US 7,045,160 B1
(45) Date of Patent: May 16, 2006

(54) MUCORALES FUNGI FOR USE IN PREPARATION OF FOODSTUFFS

(75) Inventors: André de Haan, Delft (NL); Sigbertus Godefridus Maria Geraats, de Bilt (NL); Fredericus Johannes Kruyssen, Oegstgeest (NL); Hendrik Louis Bijl, Vlaardingen (NL)

(73) Assignee: DSM N.V., TE Heerlen (NL)

( * ) Notice: Subject to any disclaimer, the term of this patent is extended or adjusted under 35 U.S.C. 154(b) by 0 days.

(21) Appl. No.: 09/720,131

(22) PCT Filed: Sep. 15, 1999

(86) PCT No.: PCT/EP99/07722

§ 371 (c)(1),
(2), (4) Date: May 17, 2001

(87) PCT Pub. No.: WO00/15045

PCT Pub. Date: Mar. 23, 2000

(30) Foreign Application Priority Data

Sep. 15, 1998 (EP) .................................. 98307450

(51) Int. Cl.
*A23J 1/18* (2006.01)
*A23J 3/20* (2006.01)

(52) U.S. Cl. .................. 426/61; 426/574; 426/656

(58) Field of Classification Search .................. 426/61, 426/574, 652, 656, 465, 468; 435/931, 939, 435/256.2, 256.6, 256.8
See application file for complete search history.

(56) References Cited

U.S. PATENT DOCUMENTS

| | | | |
|---|---|---|---|
| 3,885,048 A | 5/1975 | Liggett | 426/18 |
| 4,265,915 A | 5/1981 | MacLennan et al. | 426/28 |
| 4,293,575 A | 10/1981 | Cockram et al. | 426/104 |
| 5,288,509 A * | 2/1994 | Potman et al. | 426/60 |

FOREIGN PATENT DOCUMENTS

| | | |
|---|---|---|
| EP | 0 123 434 A2 | 10/1984 |
| GB | 2 007 077 A | 5/1979 |
| JP | 08 009922 A | 1/1996 |
| WO | WO 97/36996 A2 | 10/1997 |
| WO | WO 99/55165 A1 | 11/1999 |

OTHER PUBLICATIONS

Desjardins et al., Microbiological Reviews, 57(3), Sep. 1993, pp. 595-6041.

H.L. Wang, Journal of the American Oil Chemists' Society, vol. 61, No. 3, 1984, XP002090790, pp. 528-534.

* cited by examiner

*Primary Examiner*—Keith Hendricks
(74) *Attorney, Agent, or Firm*—Morrison & Foerster LLP

(57) ABSTRACT

The preparation of a proteinaceous substance suitable for use in a foodstuff is described which comprises fungal fells of the order *Mucorales*. The cells are grown in a fermentor vessel in a liquid which is mixed during fermentation, after which the RNA content of the fungal cells is reduced to below 4% the fungal cells processed into an edible substance. This substance is then mechanically texturized into edible textured product for inclusion into foodstuffs, for example in the form of chunks as a meat substitute.

30 Claims, No Drawings

MUCORALES FUNGI FOR USE IN PREPARATION OF FOODSTUFFS

FIELD OF THE INVENTION

The present invention relates to the preparation of edible (proteinaceous) substances using fungal cells of the order *Mucorales* and the use of these substances in foodstuffs, in particular as meat substitutes.

INTRODUCTION

Animal meat is considered to be a desirable part of the human diet, not only due to the vitamins and nutrients it provides, but also due to its flavour (particularly on cooking) and, importantly, its texture. However, an increasing number of people are turning to vegetarian or vegan diets, neither of which can include meat or meat derived products. Such diets may be due to a number of factors, but is often due to either a disliking for meat (either in texture or flavour) or due to ethical and moral considerations (for example, a belief that it is wrong to kill animals in order to feed humans).

The move towards vegetarian/vegan diets has increased in recent years by the appearance of BSE (Bovine Spongiform Encephalopathy), otherwise known as "mad cow disease", a disease that effects the nervous system in cows and is thought to be as a result of feeding cattle parts of sheep infected with a similar disease known as "scrapie". BSE has been linked with a condition in humans known as CJD (Creutzfeldt-Jacob disease).

Apart from certain edible fungi (e.g. mushrooms) proteinaceous foods containing fungi are known. One example is the traditional Indonesian fermented food, tempeh. This is usually prepared by the fermentation of *Rhizopus* fungi on soy beans (and parts thereof) acting as a moist solid substrate. The beans (or other vegetable substrate) are inoculated with the fungus and fermentation allowed for 24 to 36 hours. The beans become bound by the fungal mycelium protein produced to give a firm product which can then be sliced before eating (no additional processing is usually performed before consumption). Thus the fungi are used to hydrolyse an otherwise inedible substrate and, apart from inherently lacking much taste or flavour, tempeh is relatively dry and does not have the fibrous and juicy texture associated with meat. The fungi represent only a small amount of the product and so the fungal protein content is low. It is thus not particularly appealing as a meat substitute, at least for Westerners.

A number of edible meat substitutes or meat replacers have been proposed in recent years. Soy-based products, in particular extruded soy, are marketed, especially by American and Japanese companies, but these do not have a particularly meat-like taste or texture (indeed both soy and gluten can both have an "off" or astringent taste).

GB-A-2007077 (Maclennan/BioEnterprises) proposes a similar process to the manufacture of tempeh, except instead of soy beans the solid substrate is a starch-containing food such as sago, cereals or potatoes. However a prerequisite of this foodstuff (and tempeh) is that solid foods or ingredients are needed as the substrate for the fermenting microorganisms.

More recently workers have proposed the production of edible protein-containing substances using the production of mycelial protein by the fungus Fusarium graminearum. These substances have been increasingly used as meat substitutes, and are included in foodstuffs sold in the UK and other European countries.

BRIEF DESCRIPTION OF THE INVENTION

According to a first aspect of the invention there is provided a process for the preparation of an edible (e.g. proteinaceous) substance, suitable for use in a foodstuff, comprising fungal cells, the process comprising:
  a. fermenting fungal cells of the order *Mucorales* in an aqueous liquid contained in a fermenter vessel, the liquid comprising an assimilable nitrogen (N) source and an assimilable carbon (C) source, and mixing (and preferably aerating) the liquid and cells during fermentation;
  b. reducing the RNA content of the fungal cells;
  c. before or after (b), removing at least some of the water from the mixture of fungal cells and aqueous liquid; and
  d. processing the fungal cells into an edible substance.

By using (non-toxic) *Mucorales* fungi (e.g. those used in Asian fermented food products) one can avoid any mycotoxins that may be produced by other (e.g. prior art) organisms. Thus little or no screening for organisms that are safe for inclusion into foodstuffs may be required. This means that the products produced by the invention are more suitable for ingestion and for use in foodstuffs. The *Mucorales* organisms in general do not produce mycotoxins (or an insignificant amount or below detection), which is clearly advantageous as these organisms are incorporated whole into a foodstuff, and can mean that the processing techniques can be more efficient as mycotoxins may not need to be removed. This can overcome a problem with Fusarium organisms which can produce undesirable mycotoxins (Desjardins et al, Microbiological Reviews, 57(3): 595–604, September 1993).

Mycotoxins anticipated here are those such as aflatoxine, mevinolin, terrein and trichothecenes (the latter being produced by some *Fusarium* species). A fungus that produces any of these mycotoxins is unlikely to be allowed to be used in any form of food production, even if the manufacturer takes steps to remove the mycotoxins. It is therefore particularly important to choose fungi that will not produce these mycotoxins at any stage of the process.

A further advantage of using *Mucorales* fungi is that a relatively wide variety of microorganisms is available, depending upon the characteristics desired in the proteinaceous substance. This can allow differing physical characteristics (such as in the fibrous nature, or mouthfeel) or in chemical characteristics (taste, etc). The fungi used in the present invention have been found to give improved meat-like properties, for example a more fibrous and/or juicy texture. These fungi can also vary in terms of texture and juiciness and so allow themselves to be used in a wide variety of foodstuffs. Therefore by choice of microorganism one can provide the various desirable characteristics according to the eventual foodstuff to be prepared (using different processing techniques). In addition different microorganisms can impart different colours, and so as well as being able to prepare a white substance, one can make substances that have different colours, such as yellow to brown or even green appearance, which may be desirable for some foodstuffs.

The fungi can be of the family Choanephoraceae, such as of the genus *Blakeslea* or *Gilbertella*, for example of the species *Blakeslea trispora* or *Gilbertella persicaria*. The other three families included within the order *Mucorales* are Cunninghamellaceae, Mortierellaceae (such as fungi of the genus *Morrierella*, and in particular the species *Mortierella*

*alpina*) and, especially, Mucoraceae. Suitable fungi are usually edible (and digestible) by humans or animals.

Preferred fungi are saprophytic (that is to say, simple fungi) rather than parasitic (which are more complex). The "simple" fungi are usually preferred because they are better adapted towards hyphal growth, whereas the parasitic organisms concentrate on taking nutrients from their "host" organism.

The fungal cells are preferably of the genus *Rhizopus*, *Rhizomucor*, *Mucor* or *Mortierella*, all of which belong to the family Mucoraceae. Suitable fungi of the genus *Rhizopus*, *Mucor* or *Rhizomucor* include *Rhizopus stolonifer*, *Rhizopus miehei*, *Rhizopus pusillus*, *Rhizopus oligosporus* and, in particular, *Rhizopus oryzae*, *Mucor hiemalis* and *Mucor rouxii*; and *Rhizomucor meihei*. Other preferred strains include those of the genus *Absidia* or *Phycomyces*, such as *Absidia pseudocylindrospora* or *Phyzcomyces blakesleeanus*.

Preferred fungi can have a cell wall comprising, or primarily containing, chitin and chitosan. The cell walls may contain one or more of the sugars glucosamine (such as D-glucosamine) and/or fucose, such as L-fucose, and may be substantially free of galactose.

The fungi used in the present invention preferably do not have septa, which is in contrast to those of the group *Fusarium*. Furthermore, preferred fungi for use in the invention have branching, again unlike *Fusarium* organisms which have little or no branching (in their hyphae). Indeed, the art advocates the use of non-branching mutants (EP-A-0,123,434). The hyphae of the fungi used in the invention may have a diameter from 1 to 20 µm, such as from 2 to 10 µm, optimally from 2 to 8 µm.

The fungus may be a naturally occurring one, it may have been selected using known techniques for particular desired properties, or it may be genetically engineered.

Fungi of the order *Mucorales* are generally also of the group perfecti (in other words, not belonging to the class imperfecti) will be employed, which are able to reproduce sexually. Fungi used in the invention can also be filamentous.

As will be appreciated, the process of the first aspect is a liquid fermentation, in other words the aqueous liquid (e.g. a solution) serves as the culture medium. This contrasts with prior art processes which culture fungi on a solid substrate, that substrate being, for example, rice, soy bean or starch-containing products such as cereals or potatoes. In the invention the liquid fermentation process in (a) is preferably conducted in the absence of a solid substrate, such as one which is itself an edible foodstuff (this includes not only vegetable material or legumes but also meat and natural solid starch or carbohydrate-containing substances such as cereals, soybeans, sesame seeds or meal).

Thus a second aspect of the present invention relates to an edible (e.g. proteinaceous) substance, suitable for use in a foodstuff, comprising fungal cells of the order *Mucorales* having a reduced (or low) RNA content. This substance may be preparable by a process of the first aspect. It may be biomass or a filter cake, or such a biomass or filter cake which has been milled and/or tumbled.

A third aspect of the present invention relates to a process for the preparation of an edible (textured) product, the process comprising adding one or more edible components to an edible proteinaceous substance comprising fungal cells of the order *Mucorales* having a reduced RNA content and (if necessary) texturising the mixture.

A third aspect also includes a process for the preparation of an edible (textured) product, the process comprising mixing one or more edible component(s) with an edible proteinaceous substance comprising fungal cells of the order *Mucorales* and texturising to form a product of which at least 5% is fungal cells on a dry matter weight basis.

The fungal cells will preferably remain intact (or whole) not only during the fermentation process, but also during subsequent processing steps, including water removal, reduction of RNA content and any texturing. Thus the substance (or textured product) will contain intact (but dead or killed) fungal cells, and during most if not all stages of the preparation of the substance or the product, steps will be taken to minimize damage to and lysis of the cells or cell membranes. However, during processing some compounds may leave the cell (so that the cell membrane may "leak" a little). It is of course intended that the process of the invention involves the removal of some RNA (and if necessary also water) from the fungal cells.

The substance (and so also the textured product) contains fungal protein produced by the fungal cells. Usually this protein is intracellular and/or within the cell membrane. Extracellular protein may be present but these are often removed during processing (e.g. water removal, since the extracellular protein may be present in the aqueous liquid). Thus the proteinaceous substance, for example a biomass, can be one that is preparable by the process of the first aspect.

The proteinaceous substance preferably has at least 40%, e.g. at least 50% or even 60% or more of fungal cells. However these amounts can be much larger and the cells can constitute at least 70%, such as at least 80%, and optimally at least 90% or 95% of the proteinaceous substance (on a dry matter weight basis). With such a high content of fungal cells one can obtain a substance (and, later also a textured product) that is more juicy, fibrous and better tasting. Even after texturing the resulting edible (e.g. textured) product can have a fungal cell content the same as that quoted for the proteinaceous substance. These percentages are based on the weight of the cells in the dry matter, in other words one firstly dries the substance or product and, on the basis of the dry matter obtained, calculate (by weight) the percentage of that matter that is fungal cells.

The substance can therefore consist essentially only of the fungal cells (which can include the protein produced by (e.g. inside) those cells). During fermentation, therefore, there will usually be no extraction of isolation of any particular compound(s) or substance(s) either contained in or produced by the fungi as the fungal cells. Indeed in the processes of the invention it is preferable that RNA (or any degradation products thereof or any compounds undesirable during processing) will be the only compound(s) that is removed from the cells. Extracellular protein may be washed away from the cells and so may not be present.

The proteinaceous substance of the third aspect and textured product of the fourth aspect are edible in the sense that they can be included into a foodstuff or they are compatible with food or feed use. Although the proteinaceous substance can be eaten as such, the intention is that this is in fact an intermediate in the preparation of the textured product.

The proteinaceous substance may have, as the only edible material, the fungal cells and so may, apart from the fungal cells, be devoid of edible substances. However, various edible component(s) can then be mixed with or added to the proteinaceous substance of the third aspect to produce the textured product of the fourth aspect. Further or additional edible component(s) may be added to the textured product in the preparation of the foodstuff.

A fourth aspect of the present invention is thus the textured product. This is suitable for inclusion into a foodstuff (it can be edible, and suitably digestible, by either humans or animals) and can comprise cells of the order *Mucorales* either having a reduced RNA content or where at least 40% of the product (on a dry matter weight basis) is the fungal cells. The percentage of the fungal cells (on a dry matter weight basis) can be the same as that mentioned above for the proteinaceous substance (of the second aspect). However, as the product of the fourth aspect can be prepared by adding edible component(s) to the proteinaceous substance of the second aspect, it will be realized that the fungal cell content of the former is often lower than that of the latter. The textured product may comprise pellets, granules or sheets, it may be prepared by a process involving extrusion (and therefore may be an extrudate), may comprise a dough, a paste, or a meat-like chunk, or may be in the form of a roll (such as by rolling the substance if it is in the form of a sheet).

A fifth aspect of the present invention relates to a process for the preparation of the foodstuff, which comprises forming a foodstuff with, or including into an existing foodstuff, an edible substance according to the second aspect (for example preparable by a process of the first aspect) or a textured product of the fourth aspect (such as preparable by a process of the third aspect). This may involve adding one or more additional edible components to either the substance or to the product, or it may comprise further texturization. This process therefore includes not only preparation of a foodstuff using either the substance or the product, but it also envisages the supplementation of a foodstuff with either substance or product.

A sixth aspect of the present invention is thus provided by the foodstuff. This can comprise either the substance of the second aspect or the product of the fourth aspect. The foodstuff is preparable by process of the fifth aspect.

The foodstuff may be a sausage, pâté, burger, spread, animal feed or it may include edible pharmaceutical compositions such as tablets.

The foodstuff preferably comprises at least 5%, for example at least 8 or 10%, and optimally at least 15 or 20% of fungal cells (on a dry matter weight basis). The fungal content may be as high as that described for the textured product, but since the foodstuff can be made from that product the fungal content may be lower, for example the fungal cells may constitute only at least 25 or 30% of the foodstuff (again, based on a dry matter weight calculation).

DETAILED DESCRIPTION OF THE INVENTION

The fermentation process of the first aspect is suitably conducted in a fermenter vessel adapted for containing the aqueous liquid, such as a vat, and this vessel may be pressurized. It may be also be adapted to allow the continuous or continual supply of the assimilable nitrogen and/or carbon sources. Stage (a) and later stages are therefore preferably conducted aseptically. Although the fermentation can be a continuous process, with regular harvesting or removal of the fungal cells (and accompanying protein), the process can be a batch process if desired, such as a repeat fed batch process (one or more additions of C and/or sources after fermentation has begun). Thus the fermentation process can be stopped or halted, and the fungal cells removed from the vessel, before another or fresh fermentation is begun.

The vessel may additionally be adapted to perform, or allow to be conducted, aeration and/or mixing of the cells and liquid, such as agitation of the solution, which may be stirring, for example achieved using mechanical means.

The carbon and nitrogen sources may be provided in separate compositions. This because the different sources may be subject to different sterilizing conditions, and furthermore it allows a variation in the relative amounts of carbon and nitrogen during fermentation.

The nitrogen and/or carbon sources can be supplied (or added) separately, or supplied simultaneously, or supplied as a combined preparation. They may thus present in the same composition (if thought necessary) which is preferably a liquid. The C and/or N sources can be added (to the fermenter vessel) either before the fungal cells are added (to the vessel), in other words prior to inoculation, or during fermentation.

If the supply is continual (or intermittent), it is preferred that for each instance of supply (e.g. "shots" or additions) the addition of both carbon and/or nitrogen sources is the same.

Preferred C:N (weight) ratios are at least 6:1, but may vary from 10:1 to 150:1, such as from 15:1 to 50:1, optimally from 25:1 to 40:1.

For continual supply, preferably the time during which the nitrogen and/or carbon sources are supplied are greater than the time when they are not. Thus, during fermentation supply is advantageous for at least 50% of the time. If supply of one or both sources is intermittent, then there should be at least 2, preferably at least 5, and optimally at least 10, additions to the aqueous liquid of the nitrogen and/or carbon source. For continuous supply or further additions it is preferred that the C:N ratio in the sources is kept at (about) the same ratio as when fermentation started.

The carbon and/or nitrogen sources may be complex sources, or individual or isolated compounds. Non-complex sources are preferred (these may have or produce fewer mycotoxins) and so in the latter two cases these may be added in a high degree of purity, and can be common (or commercially available) chemicals. Preferably both C and/or N sources are not solid, and suitably both are liquids.

Suitable nitrogen sources include ammonia or ammonium ions. The advantage here is that ammonia can act as a pH regulant. This may be supplied in the form of an ammonium salt, such as nitrate, sulphate or phosphate or in the form of ammonium ions themselves, for example an aqueous solution of ammonium hydroxide.

Other inorganic nitrogen sources can also be used, such as sodium nitrate, urea or an amino acid such as asparagine or glutamine.

Other complex sources include yeast hydrolysates, primary yeast, soy bean meal, hydrolysates of casein, yeast, yeast extract or rice bran.

The carbon source can comprise (complex sources such as) maltodextrin, oat flour, oat meal, molasses, vegetable (e.g. soy bean) oil, malt extract or starch. Preferred (non-complex) carbon sources include carbohydrates or sugars, such as fructose, maltose, sucrose, xylose, mannitol, glucose, lactose, citrate, acetate, glycerol or ethanol.

Preferred nitrogen and/or carbon sources are water soluble or water miscible.

The aqueous liquid may additionally contain other substances to assist in the fermentation, for example a chelating agent (e.g. citric acid), an anti-foaming agent (e.g. soy bean oil), a vitamin (e.g. thiamine and/or riboflavin), any necessary catalytic metals (for example, alkali earth metals such as magnesium or calcium, or zinc or iron and/or other metals such as cobalt and copper), phosphorus (e.g. phosphate) and/or sulphur (e.g. sulphate). Preferably the aqueous liquid will have a low sulphur content, for example less than 3.0 g, preferably less than 2.0 g or 1.0 g, of sulphur by liter of aqueous liquid.

Preferably, the pH, temperature and/or oxygen content (of the aqueous liquid) during fermentation is controlled. This may be to keep the pH, temperature and/or $O_2$ content constant or within a desired range. In this respect, the fermented vessel may have pH, temperature and/or $O_2$ content sensors.

The pH of the aqueous liquid during fermentation may be from 2 to 8, such as from 3 to 7, optimally from 4 to 6.

The temperature of the aqueous liquid during fermentation is not particularly critical, but may be from 20 to 50° C., such as from 25 to 40° C., optimally from 30 to 35° C.

It is important that during fermentation mixing occurs. In other words, the aqueous liquid and fungal cells are suitably either mixed or agitated. This may be achieved if aeration is provided, in other words by bubbling air into the aqueous liquid. This may serve the additional purpose of providing oxygen to the fungal cells: hence the fermentation is preferably an aerobic one.

Other means of agitation or mixing include stirring, for example using an impeller. This may be of a hydrofoil axial flow design or may be designed so that the aqueous medium is forced radially outwards from the impeller (such as a turbine). Even if there is no stirring it is preferred that the fungi are provided with oxygen during fermentation, and so aeration (e.g. by bubbling air, $O_2$ or other oxygen-containing gas) is advantageous here. Aeration may be at from 0.1 to 2.0, such as from 0.5 to 1.0 vvm.

One of the advantages of aeration and/or agitation is that the oxygen content of the aqueous liquid can be kept relatively high. This may be at least 10%, such as at least 15%, optimally at least 20% (in terms of air saturation). This allows a more efficient formation process, and can thus result in a quicker and/or higher content of fungal cells and/or fungal protein. This is particularly advantageous for fungal cells used in the invention because these are sufficiently robust to allow agitation and/or mixing during fermentation. This is not always possible however with (the more sensitive) fungal cells of the group Fusarium, as the art teaches the use of airlift fermentors, which do not have mechanical stirrers, with such organisms. Thus with most *Mucorales* organisms one does not have to use expensive equipment, such as airlift fermenters, developed for other (less robust) organisms, which means the edible substance can be produced more cheaply.

The fermentation may take from 1 to 12 days, such as from 2 to 6 or 7 to 10 days, and optimally from 2 to 4 days. A shorter fermentation lends itself towards a batch, rather than continuous, fermentation process.

Once fermentation has finished, or fermentation is to be stopped, water can be removed from the combination of the fungal cells and the surrounding liquid produced. In the art this combination of aqueous liquid and fungal cells is often referred to as a "broth". During fermentation the vessel should contain only this broth, and this is preferably entirely liquid (and so devoid of any solid material). The cells may be rinsed, such as with an aqueous liquid e.g. water, before or after this water removal stage, and either or both may result in the separation of the cells from extracellular matter (e.g. protein) if desired. If necessary depelleting (the dispersion or minimisation of any pellets in the liquid) may be conducted before water removal (For example by sonication or shear mixing).

Water removal is preferably by mechanical means or by mechanical techniques. These include various solid-liquid separation techniques such as mechanical de-watering, filtration, centrifugation (preferred), settling (in other words, the material is allowed to settle, thus using gravity), heating or drying.

After this de-watering the water content can be from 50 to 90%, such as 60 to $^{87}$%, optimally from 75 to 85%.

Following this (optional) de-watering, the RNA content of the fungal cells can then be reduced. This can be achieved by chemical and/or physical methods. The preferred method is to use and so take advantage of one or more enzymes already inside the fungal cells to digest the RNA. This may allow any resulting (small) RNA molecules (or degradation products thereof) to pass through, and so outside, the cell membrane. Suitably the (undesirable) nucleotides inside the cell are cleaved into 2, 3 and 5-nucleotides; thus it may be these nucleotides that are transported through the cell membrane. Dewatering may also remove other compounds not desired during further processing, such as glucose (for example due to later heat treatment).

A preferred method of RNA removal is heat treatment, in other words heating the fungal cells. This may have two effects. Firstly, the cell becomes more permeable, allowing RNA and other molecules to pass outside the cell. It may also increase the activity of nucleases, such as RNAases, inside the fungal cells. A further advantage is that such heat treatment may inactivate any undesirable enzymes inside the fungal cells. Alternatively or in addition (ribo)nucleases and/or RNAses may be provided or added, rather than just relying on enzymes inside the cells.

The preferred RNA reduction technique therefore involves the transfer of RNA from inside the fungal cell to the outside of the fungal cell, for example into a surrounding aqueous liquid (e.g. the broth). The cells can later be separated or removed from this aqueous liquid.

If heat treatment is employed for RNA reduction, the fungal cells can be heated to a temperature of from 40 to 80° C., preferably from 50 to 70° C., optimally from 55 to 65° C. This may be for a time from 20 to 50 minutes, preferably from 25 to 40 minutes, optimally from 25 to 35 minutes. The temperature of the heat treatment to enable RNA reduction, and the length of time for which this temperature is maintained can be important. If the temperature is too low, this may not active enzymes inside the cells that will reduce RNA content. Similarly, if the temperature is too high, then this will denature or otherwise result in inactivation or such enzymes. A balance therefore needs to be struck, and a temperature chosen between these two extremes. The conditions are thus preferably such that enzyme(s) inside the cells are activated or allowed to reduce the RNA content of those cells. It may not be enough to simply increase the temperature from, for example, 30 to 100° C., because in doing so the cells may not be long enough at an intermediate temperature which allows the enzymes inside the cells to reduce the RNA content. Thus, depending on the organism in question, a temperature and time is chosen so that RNA reduction occurs: although there are prior disclosures of heating fungal cells these conditions may not be suitable for effecting RNA reduction (because either the temperature or the time at that temperature will not allow the enzymes inside the cells to reduce the RNA content).

One other method of RNA removal is to subject the fungal cells to an acid or alkaline pH. If an acid pH is provided, this may be from 3 to 4.5, such as from 3.5 to 4.2. This acid treatment may last from 15 to 120 minutes, such as 30 to 60 minutes. It may, if necessary, be combined with heat treatment, such as from 40 to 60° C., such as from 50 to 60° C. Suitable acids include inorganic acids such as hydrochloric acid, phosphoric acid, nitric acid and/or sulphuric acid. A fungicide may also be used to kill the cells instead of or in addition to the methods mentioned.

If an alkaline pH is provided, this may be from a pH of 8 to 12, such as from 9 to 11, optimally at a pH of from 8 to 10. The alkali may be provided by ammonia, alkali or alkaline earth metal oxides, hydroxides or carbonates. The alkali treatment may be for the same time as specified for the acid treatment, and may optionally also be accompanied by heat treatment as described for the acid treatment. However in some cases a lower elevated temperature may be more appropriate, for example from 40 to 80° C., such as from 60 to 70° C., optimally from 62 to 68° C.

The fungal cells may be subjected to both acid and alkali treatment, either of which may be combined with heat treatment. Preferably though the RNA reduction is a one stage process. The acid or alkali solution used to contact the fungal cells may be discarded, reused or recycled.

If necessary the RNA removal may be followed by pasteurization or a heat shock treatment. This may involve particularly high temperatures, such as 100 to 150° C. or 40 to 120° C., optimally 130 to 140° C. or 40 to 60° C. This may only last for 30 to 200 seconds, such as from 80 to 120 seconds. For the higher temperature ranges: it may be from 5 to 120, e.g. 20 to 50 minutes for the lower temperatures. This heat shock treatment may be provided after acid and/or alkali treatment.

Thus heat treatment and/or pasteurization may be in addition to heating for RNA removal. This may be necessary if the RNA removal does not kill all the cells. Alternatively this stage could be thought of as sterilization or the inactivation of undesirable proteins or enzymes, for example proteases, lipases, amylase, phospholipases and/or lipoxygenases. This step (as with RNA reduction) may be performed either if the fungal cells are still in an aqueous liquid (for example the broth, e.g. while still in the fermented vessel) or (preferably) if they have been subjected to one or more water removal steps. Here the heat treatment may either reduce water content and/or make the fungal cells more water-insoluble.

Whichever RNA content reduction technique(s) are employed, it is desirable that the fungal cells remain intact, or whole, in other words are not lysed. The cells should thus be intact but not alive (e.g. killed or non-viable).

The fungal cells after RNA reduction preferably have an RNA content below 4.0% or 2.0%, such as from 0.1 to 2.0%, preferably from 0.5 to 1.5%. Optimally the RNA content is from 0.4 to 0.8%. These percentages are based on the dry weight of the cells. Cells with a reduced RNA content may thus have a content below that of the naturally occurring fungus or the fungus used in the fermentation process (stage (a) of the first aspect).

The protein produced may be located in various parts of the fungal cell. It may represent up to 30%, such as up to 40% and optimally up to 50% of the fungal cell itself (based on dry weight). The fungal protein may be inside the cell (intracellular) or inside the cell wall. The former may include two different "types" of proteins, for example structural proteins (those concerned with DNA; ribosomes; membranes etc) and catalytic proteins (for example enzymes). Cell wall proteins include not only those that are inside or part of the cell wall, but may be outside of the cell wall but still bound to the cell wall. This is contrast to secreted (e.g. extra cellular) proteins that are not bound to the cell, and which are usually discarded or otherwise lost during processing. The material containing the fungal cells may then be subjected, if necessary, to a (further) water removal step, or de-watering. This will preferably reduce the water content to from 50 to 90%, such as from 60 to 85%, optimally from 75 to 85%. This may be after one or more rinsing or washing steps (for example with water, e.g. tap water). The resulting material may have a dry matter content of from 10 to 40%, preferably from 15 to 35%, optimally from 20 to 30%.

The liquid removed at this stage preferably contains the RNA, RNA degradation products or any other undesired substances either removed from the cells or transferred from the inside the outside of the cells, in the previous RNA reduction or heating stage(s). Procedures for removing the water here are the same as described for the optional removal step earlier following fermentation. However, at this stage filtration is preferred, such as vacuum filtration.

At this stage in the process one can have produced the proteinaceous substance that is the subject of the third aspect of the invention. It may be in the form of an (e.g. aqueous) paste, a biomass or a filter cake. Further processing, in particular texturising, for example using mechanical methods, can then be performed in order to produce the edible (proteinaceous) textured product of the fourth aspect. Other processing techniques may include chemical, physical and/or enzymatic treatment.

To the substance of the second aspect one may add or mix in one or more edible component(s). These may be to add texture and/or flavour. Preferred components include hydrocolloids, for example pectin, starch, carrageenan or alginate. This may be before or after mechanical processing step(s) such as milling, crumbling, cutting, kneading and/or homogenising.

Also contemplated are proteins, for example milk protein such as casein, ovoprotein such as egg albumin or eggs themselves (yolk and/or egg white), vegetable proteins such as soy, or cereal proteins, such as gluten, or enzymes (e.g. proteases, phosphodiesterases).

Other edible components include flavour enhancers such as salt, sugar, IMP and/or GMP (although in this case it will be preferred that the RNA level does not exceed those mentioned earlier for the fungal cells), flavouring agents such as spices, herbs, proteins (e.g. from 2 to 5% such as a milk protein, e.g. casein, a vegetable protein, an ovoprotein, e.g. albumin), hydrocolloids (e.g. from 5 to 20% such as pectin, carageenan, agar, xanthan, gellan, galacturonic or mannuronic acid or salts thereof), flour, alginate (such as 0.2 to 1.0%), edible polymers (e.g. cellulose, methylcellulose), gelling agents (such as egg albumin, whey protein and alginate), polysaccharides (such as from 0 to 10%, for example starch or pectin), colouring agents, plant material such as vegetables (onions, carrots, soy, peas, beans or cereals such as wheat, oats, barley) and emulsifiers. It may also include meat-like flavourings, such as beef, pork or poultry (chicken or turkey) flavourings or other non-meat products. Additional components may be provided to improve taste (organoleptic properties) to improve water binding, fat binding, emulsification properties, texture, volume, viscosity, flavour, aroma and/or colour (dyes, carotenoids, etc.). Egg albumin may be included to improve whippability, colouring or as a binder of other proteins. Egg yolk can be used for emulsification, colour or flavour. Soy protein can be employed for water binding, fat binding and to improve texture. Gelatin can be included to improve gelation. Milk protein or salts thereof for water binding and fat binding flavour or texture and wheat gluten for water binding, texture or flavour. The edible proteinaceous product may therefore be used to replace or be provided in addition to one or more of the following: vegetable proteins, egg white, gelatin, edible proteinaceous foaming agents and milk proteins. Fibrous materials may also be included (e.g. vegetables such as onions).

The texturization is intended to provide texture to the product so that it has meat-like texture and/or it has a mouthfeel similar to meat. It may thus have a fibrous or meat-like appearance.

Texturization is preferably by one or more mechanical means. These include milling, crumbling, mincing, slicing, cutting (e.g. into chunks, slices or layers), kneading, layering, rolling, sheeting and/or extruding. Preferably it may result in the alignment of the fungal protein into fibres, which may assist to give the product the appearance of meat.

The texturising may however comprise physical methods, for example heating and/or freezing. Both of these techniques may also result in further water removal. Freezing in particular may assist in alignment of the fungal cells into a fibrous appearance.

The mechanical shaping may include placing the mixture of fungal cells and edible component(s) into a mould or other container of a desired shape, and then cooling (such as freezing) and/or heating (for example 70 to 100° C., to cause gelling, for example) by various methods such as steaming, boiling and/or frying. Pressure may be applied if necessary. The material can then be removed from the mould or container, and can retain the shape of that container.

The shaped product may for example be in the shape of animals, birds or fish, letters of the alphabet, numbers, etc which may be particularly suitable for foodstuffs for children.

The textured product may also be in the form of a dried powder, which may be included in a foodstuff to increase mouthfeel or to increase viscosity.

A particularly preferred texturization method involves granulation, for example to produce granular particles. Before any texturization, the combined fungal cells and fungal protein may have an average water content of from 15 to 85%. After texturing (e.g. granulation), the resulting granules may have an average water content of below 30%, e.g. less than 20%, optionally less than 10%.

Preferably granulation is achieved using extrusion. This is preferred because extrusion conditions can be adjusted to minimise disruption of the fungal cells. Extrusion may therefore be conducted without heating, for example at from 15 to 85° C. During extrusion the granules may form naturally, falling away under their own weight (from the die plate, such as by gravity) or one can use a cutter, such as a rotating blade, to cut the long strands of "spaghetti" produced by the extrusion. Following extrusion the granules preferably have a water content less than 15%, such as less than 10%, and optimally from 3 to 7%. The granules may have a diameter of from 0.3 to 10 mm, such as from 0.7 to 5 mm, optimally from 1 to 3 mm.

Extrusion may thus be used to form elongate "spaghetti" like products (these may be cylindrical and/or of circular cross-section) if passed through a suitable die-plate (e,g, with circular or square holes). However formation into for example sheets or layers can be achieved by passage (e.g. using extrusion) through one or more slots. These forms may also be prepared by the use of one or more moving surfaces, such as roller(s) and/or cylinder(s). These may be moving in the same direction or counter-rotating and there may be one, two or up to five such surfaces.

The proteinaceous product may therefore be in a variety of forms. For example, it may be in the form of chunks, for example meat-like chunks, dough, sheets, granules, extrudate, slices or may be layered. These forms may be dried or frozen. The product may be included into the foodstuff with no or additional processing. They may be recognizable as chunks in the foodstuff, and may have the appearance of meat.

They can thus be included in foodstuffs as meat substitutes, and foodstuffs contemplated include pies, microwaveable meals, savoury snacks, sausages, patties, burgers, spreads and pâté, dried powder (e.g. for soups).

The textured product may be in the form of pellets or granules, and these too may be dried or frozen. They may be adapted for dehydration before consumption. These products may be included in soups or sauces. The product (e.g. pellets or granules) may be included in burgers or sausages for example with an (e.g. edible) binder. A suitable sausage preparation process and sausage making machine is described in the International patent application no. PCT/EP99/02795 filed on 26$^{th}$ Apr. 1999 in the name of Gist-brocades B. V.

A particularly preferred process of the present invention may therefore comprise:
1. fermenting fungal cells of the order *Mucorales*, for example in an aqueous liquid contained in a fermenter vessel, the liquid comprising assimilable nitrogen and carbon sources. The liquid and cells can be mixed and/or aerated during fermentation and if necessary depelleting can be performed;
2. optionally removing water, for example removing the, or water from, the aqueous liquid, preferably using mechanical techniques such as filtration, centrifugation (e.g. once or twice), settling and/or drying;
3. reducing the RNA content of fungal cells, for example by physical, chemical and/or enzymatic treatment(s), but preferably by heat treatment (e.g. 60 to 75° C. for 25 to 35 minutes;
4. heat treating, pasteurizing or killing the cells or otherwise (e.g. chemically) inactivating undesirable proteins or enzymes inside the fungal cells;
5. optionally, removing water (e.g. if not done in stage 2), such as to provide the edible (e.g. proteinaceous) substance;
6. adding to the fungal cells (or edible substance) one or more edible components;
7. texturising the fungal cells (either before (e.g. milling or crumbling) or after (e.g. kneading or extruding) edible component addition in stage 6), for example using mechanical processing;
8. subjecting the fungal cells to physical treatments such as heating (e.g. boiling, steaming, frying) and/or freezing, or otherwise removing water;
9. optionally before or after stage 8, shaping and/or otherwise mechanically processing (if necessary) to give a textured product; and
10. including or processing the edible product into a foodstuff or supplementing a foodstuff with the product.

The foodstuff can comprise a textured edible product either of the fourth aspect or preparable by a process of the third aspect. As will be expected, the foodstuff may contain one or more additional edible components or ingredients in addition to the fungal cells. These may be the same as those described above in relation to the proteinaceous product.

The textured product can be included into the foodstuff as it is, in other words it may simply be used to supplement an existing foodstuff or it may be used in the preparation of a foodstuff. It may be heated first to generate nicer flavours or to brown the product.

Preferred foodstuffs include ready-made or convenience meals, or microwavable meals, burgers, pies, pasties, sausages and soups. The product can be used a substitute for meats such as pork, beef, poultry, game, ham, veal or even fish.

These foodstuffs are of course intended for human consumption, although foodstuffs for animals, in particular pets (such as dogs and cats), such as canned foodstuffs, or farm animals (pigs, cows, sheep etc) are contemplated.

Other foods can be included as components or ingredients, for example rice and pasta.

Preferred features and characteristics of one aspect of the invention are applicable for another aspect mutatis mutandis.

The invention will now be described by way of example with reference to the accompanying Examples, which are provided merely for the purposes of illustration and are not to be construed as being limiting.

EXAMPLES

Comparative Example 1

Selection of Suitable Microorganisms

The microorganism needs to be food grade and the substance should contain "valuable" proteins. The essential nutrients as in meat should also preferably be present. The morphology/structure of the biomass has to be suitable to produce a mycoprotein enriched product with a "bite" and organoleptic sensation of meat-like products.

The Examples demonstrate that manufacturing fungal food from *Mucorales* fungi is feasible, and that the more "primitive" families within the *Mucorales* order can be preferable.

Advantages of *Mucorales* fungi include:
1. low or absent mycotoxin production;
2. simple and cheap biomass production: good growth to high concentrations in clear media (composed of salts, a well-defined complex N-source, and glucose or oligosaccharides);
3. down-stream processing procedures are acceptable for foodstuffs; and
4. good quality of end product.

Flask Experiments

In flask experiments various strains were tested belonging to the *Mucorales* families of Choanephoraceae, Mucoraceae, and Mortierellaceae to test their growth in simple and clear media.

Growth was tested in several different media including the two semi-defined media:

| compound | concentration |
| --- | --- |
| yeast extract or peptone | 5 g/kg |
| glucose | 30 g/kg |
| potassium phosphate | 0.10 M |
| ammonium sulphate | 0.1 M |
| magnesium sulphate | 1.25 mM |
| zinc sulphate | 0.03 mM |
| manganese sulphate | 0.2 mM |
| iron chloride | 0.09 mM |
| copper sulphate | 0.03 mM |

The components were dissolved in deionized water, and sterilized for 20 minutes at 120° C.: the glucose was sterilized separately. The pH after sterilization was 6.0.

The experiments were conducted in Erlenmeyer flasks (100/500 ml). Inoculation took place with a suspension of spores prepared freshly by growing the strains for several days on a malt agar surface, rinsing the spores from the surface and storing them in a freezer. The flasks were incubated between 25 and 35° C. for 2 to 4 days on an orbital shaker (with a 2.5 cm stroke at 250 rpm).

The following strains were tested:

| species | family | source |
| --- | --- | --- |
| Blakeslea trispora | Choanephoraceae | CBS 130.59 |
| Gilbertella persicaria | Choanephoraceae | CBS 247.59 |
| Absidia pseudocylindrospora | Mucoraceae | CBS 100.2 |
| Phycomyces blakesleeanus | Mucoraceae | CBS 226.92, NRRL 1555 |
| Rhizopus oryzae* | Mucoraceae | own isolate* |
| Mucor hiemalis | Mucoraceae | CBS 242.35 |
| Rhizomucor miehei* | Mucoraceae | own isolate* |
| Mucor rouxii | Mucoraceae | CBS 416.77 |
| Mortierella alpina* | Mortierellaceae | own isolate* |

*Strains are commercially available, e.g. from the CBS (Centraal Bureau voor Schimmelcultures, Delft, The Netherlands).

All strains grew well within several days, usually in a mixed form of both filamentous mycelium and pellets. In all cases it was possible to obtain at least 5 g biomass/liter of broth in the course of incubation, measured by filtering the biomass and weighing it after drying for 24 hours at 105° C. on a preweighed filter paper. The presence of pellets was checked visually.

Comparative Example 2

Fermentor Experiments

As part of the scale-up process all the strains from Example 1 were subjected to lab scale fermentor experiments. The objective was to test them for growth in simple media, growth to high biomass concentration that allows further scale-ups and growth in a form that allows inclusion in a foodstuff.

The experimental set up was as follows, starting with inoculum preparation.

The spore suspension was prepared as described in the previous Example. With this spore suspension an inoculum culture was started, using a soy bean meal based medium to promote hyphal growth (soy flour 15 g/kg, yeast extract 5 g/kg, $K_2HPO_4$ 1 g/kg and glucose. $H_2O$ 20 g/kg). The medium was sterilized for 45 minutes at 120° C. in Erlenmeyer flasks at pH6. As soon as full growth had been reached the culture was transferred to a lab fermentor, containing medium that was prepared using the following components:

| component | concentration (g/kg) |
| --- | --- |
| yeast extract | 1 |
| glucose | 20 |
| ammonium sulphate | 6 |
| magnesium sulphate.7 $H_2O$ | 2 |
| calcium chloride | 0.5 |
| potassium monophosphate | 3 |

-continued

| component | concentration (g/kg) |
|---|---|
| zinc sulphate.7H$_2$O | 0.0144 |
| iron sulphate.7H$_2$O | 0.15 |
| manganese sulphate.1H$_2$O | 0.0228 |
| copper sulphate.5H$_2$O | 0.0024 |
| cobalt sulphate.7H$_2$O | 0.0038 |
| thiamine.HCl | 0.004 |
| nicotinic acid | 0.002 |

All compounds were dissolved in deionized water and mixed, except the glucose and the phosphate which were prepared separately. The pH was adjusted to 6.0 or 4.5 using NaOH, and the medium was sterilized in the fermentor for 45 minutes at 121° C. in an autoclave. The glucose solution and phosphate solution were added after separate sterilization for 20 minutes at 120° C., the first after acidification to pH 5 with phosphoric acid.

Next to the batch medium a carbohydrate feed was supplied which consisted of glucose at a concentration of ca. 500 g/kg. The preparation was as described for the glucose solution of the batch medium.

The fermentor was equipped with temperature, pH and foam controls. To adjust the pH, solutions of ammonia and sulphuric acid were used. Dissolved oxygen concentration and the composition of the liberated gas were measured. The culture was aerated using ca. 1 volume of air per volume of broth per minute. Mixing was intensive using Rushton turbines and baffles. The glucose feed was applied at a rate between 1 and 5 g of glucose/kg broth/hour and started when the glucose concentration in the broth had decreased to a concentration below 5 g/kg.

Samples were taken twice every 24 hours for off-line analysis of concentrations of unused substrate, biomass and by-products. Microscopic inspection was also performed.

The following strains, thus tested in flasks for experiments in lab scale fermentors, were selected:

*Rhizopus oryzae, Morrierella alpina, Blakeslea trispora, Gilbertella persicaria* and *Absidia pseudocylindrospora*.

In all cases the biomass accumulated to concentrations from 20 to 50 g/kg within 80 hours of cultivation.

All strains thus indicated potential to be able to produce biomass in a simple medium and at a low cost when scaling up the process.

Comparative Example 3

Morphology Analysis

In shake flasks various microorganisms were cultivated according to the procedures given in Example 1. The morphology of the biomass was examined by light microscopic methods. The characteristics found are shown in Table 1. The morphology of the *Mucorales* organisms was different to that of the *Fusarium* species.

TABLE 1

| Strain | Branched |
|---|---|
| *Fusarium graminearum* (now reclassified as *F. venenatum*, IMI 145425) | no |
| *Mortierella alpina* | yes |
| *Gilbertella persicaria* | yes |
| *Rhizopus oryzae* | yes |
| *Absidia pseudocylindrospora* | yes |

Examples 4 and 5 and Comparative Example 6

Lab Scale Fermentation and Biomass Analysis

In Example 4, lab scale fermentors were used to cultivate three microorganisms (*Absidia pseudocylindrospora, Gilbertella persicaria* and *Mortierella alpina*) according to the procedures described under Example 2 and the same conditions were used to culture *Fusarium venenatum* (Comparative Example 6).

In Example 5 *Rhizopus oryzae* was cultured on a production scale (for details see Example 8: a part of the broth was used for the following analysis).

The following recovery procedure was used to first prepare a biomass filtercake:

centrifugation and washing the biomass (to remove excess medium components like glucose);

heat treatment at 65° C. to reduce enzymatic activity and to reduce RNA;

heat treatment to 90° C. to pasteurise the broth;

filtration on a lab filter press, including washing with tap water; and packing and storage.

Centrifugation. Portions of 1 liter of biomass were centrifuged in a Beckmann centrifuge (type J-6M/E) for 5 minutes at 5000 rpm. The supernatant was decanted and discarded. The pellet was resuspended in tap water and recentrifuged. The supernatant was decanted again. The washed pellet was resuspended in tap water.

Heat treatment (RNA reduction): the broth was heated to 65° C. and kept at this temperature for 30 minutes.

Heat treatment (to kill enzymes): the broth was further heated to 90° C. and kept at this temperature for 30 minutes.

Filtration: the heated broth was filtered in a 2 liter filter press (type Seitz Enzinger Noll, Germany) provided with a polypropylene filter cloth at a starting pressure of 0.5 bar.

The resulting cake was washed with 10 cake volumes of tap water. After washing the cake was blown dry with air at 2 bar for 15 minutes. The cake was collected for further treatment. The cake was analysed for dry matter, RNA, crude protein (Kjeldal-N) and fat. The data resulting from analysis is given in Tables 2 and 3.

TABLE 2

| Example | Strain | start volume (ml) | total cake (g) | dry matter of cake (%) | Protein (N × 6.25) % | fat (%) | RNA (g/kg) |
|---|---|---|---|---|---|---|---|
| 4 | *Mortierella alpina* | 3250 | 282 | 26 | 13.0 | 4.46 | 2.85 |
| 4 | *Gilbertella persicaria* | 3700 | 1135 | 15.3 | 5.3 | 2.54 | 0.77 |

TABLE 2-continued

| Example | Strain | start volume (ml) | total cake (g) | dry matter of cake (%) | Protein (N × 6.25) % | fat (%) | RNA (g/kg) |
|---|---|---|---|---|---|---|---|
| 4 | Absidia pseudocylindrospora | 3400 | 284 | 20.6 | 9.9 | 3.44 | 4.45 |
| 4 | Gilbertella persicaria | 2940 | 349 | 16.5 | 7.2 | 2.07 | 3.68 |
| 5 | Rhizopus oryzae | 10000 | 682 | 16.1 | 6.9 | 1.95 | 4.82 |
| 6 (Comp) | Fusarium graminearum | 3500 | 552 | 24.6 | 16.1 | 2.12 | 13.1 |

TABLE 3

(Calculated on dry matter)

| Example | Strain | protein (% w/w) | fat (% w/w) | RNA (% w/w) |
|---|---|---|---|---|
| 4 | Mortierella alpina | 50.0 | 17.1 | 1.1 |
| 4 | Gilbertella persicaria | 34.6 | 16.6 | 0.50 |
| 4 | Absidia pseudocylindrospora | 48.1 | 16.7 | 2.1 |
| 4 | Gilbertella persicaria | 43.6 | 12.5 | 2.2 |
| 5 | Rhizopus oryzae | 43.3 | 12.2 | 0.3 |
| 6 (Comp) | Fusarium graminearum | 65.5 | 8.6 | 5.3 |

Example 7

Pilot Plant Production

Fermentations of the *Rhizopus oryzae* strain used in Example 2 was scaled up in a pilot plant fermenter with a working volume of 3 m³ from the conditions as described in Example 4. After fermentation the broth was cooled to 5–10° C. and harvested.

A part of the broth (100 liters) was centrifuged in a Westfalia NA7 disc separator after dilution with tap water to 500 liters. The centrifuge was provided with 4 nozzles, each of a diameter of 1 mm. Two streams of fluid were obtained. The supernatant (400 liters) was discarded and a concentrate stream that contained the biomass (fungal cells) retained. The concentrate was diluted to the original volume with a 100 mM solution of $K_2HPO_4$.

The mixture was recentrifuged and the supernatant was discarded.

The washed concentrated biomass was then heated to 65° C. for 30 minutes. The concentrated biomass was further heated to 90–95° C. and kept at that temperature for 30 minutes.

Part of the resulting broth (1.35 m³) was filtered in a Schule membrane filter press with a filtration area of 6 m² and a pressure of 0.3–2 bar. The obtained filter cake was washed with cold tap water (5–10° C.). The filter cake was squeezed by the membranes at a pressure of 6 bar. This resulted in 73 kg filter cake with a dry matter of 24.8%.

Example 8A

Preparation of Edible Biomass

Three production fermentations the Rhizopus oryzae strain used in Example 2 were performed in a standard production fermenter with a working volume of 30 m³. The fermenter had a pH control, a Rushton turbine with adjustable speed, air supply, foam control and temperature control. At harvest the production microorganisms were killed and the RNA content reduced by heating the biomass to 50–55° C. with direct steam in the presence of 1 g/l benzoic acid at pH 4.5–5.0. After reaching 50–55° C. the broth was cooled to below 20° C. The broth was transferred to another vessel, diluted with cold tap water and further cooled to 4–6° C. The cooled broth was then filtered in a Schenk membrane filter press with a working cake volume of 2.5 m³ and the cake washed with 20 m³ of cold tap water. The cake was squeezed by applying pressurized water in a membrane system (4–9 bar). The cake was discharged from the filter press and part of this crumbled, packed in bags and frozen in a cold store at −15 to −20° C. Part of the frozen biomass was cut into particles having a size of from 1–3 mm and two or three samples from each of the three fermentations were taken for the following analysis (Table 4).

TABLE 4

| Fermentation No. | Sample No. | Squeeze Pressure (bar) | Total Cake (kg) | % dry matter (w/w) |
|---|---|---|---|---|
| 1 | 1 | 9 | 362 | 50–55 |
| 1 | 2 | 9 | 383 | 50–55 |
| 2 | 1 | 4 | 385 | 45–50 |
| 2 | 2 | 4 | 404 | 42–46 |
| 2 | 3 | 4 | 437 | 42–46 |
| 3 | 1 | 4 | 449 | 42–46 |
| 3 | 2 | 4 | 392 | 36–40 |

The samples were further analysed chemically (for RNA, crude protein (as Kjeldahl-N), fat, mycotoxins and other components) and gave the following results (Table 5).

TABLE 5

| | Fermentation No. - Sample No. | | | | |
|---|---|---|---|---|---|
| | 1-1 | 1-2 | 2-2 | 2-3 | 3-1 |
| Dry matter (%) | 52.1 | 52.1 | 42.5 | 42.9 | 41.1 |
| Ash (%) | 1.6 | 1.6 | 1.3 | 1.1 | 1.8 |
| Total crude fibres (%) | 30.1 | 30.1 | 27.4 | 27.5 | 27.0 |
| Protein (as N × 6.25) (%) | 43.2 | 43.2 | 39.7 | 40.1 | 43.3 |
| Total fat (%) | 12.7 | 12.7 | 16.8 | 16.8 | 12.2 |
| RNA (mg/kg) | 4222 | nd | 1132 | nd | 2518 |
| RNA (%) | 0.4 | nd | 0.1 | nd | 0.3 |
| Carbohydrates | 12.5 | 12.5 | 14.9 | 14.5 | 15.8 |
| Total amino acids % calculated | 26.11 | nd | 23.90 | nd | 25.13 |
| Total fatty acids % calculated | 11.9 | nd | 15.7 | nd | 11.5 |
| Mycotoxin (µg/kg) | | | | | |
| Aflatoxine B1 | <2.0 | <2.1 | <2.3 | <2.3 | <2.4 |
| Aflatoxine B2 | <2.0 | <2.1 | <2.3 | <2.3 | <2.4 |
| Aflatoxine G1 | <2.0 | <2.1 | <2.3 | <2.3 | <2.4 |
| Aflatoxine G2 | <2.0 | <2.1 | <2.3 | <2.3 | <2.4 |

TABLE 5-continued

| | Fermentation No. - Sample No. | | | | |
|---|---|---|---|---|---|
| | 1-1 | 1-2 | 2-2 | 2-3 | 3-1 |
| Ochratoxin A | <2.0 | <2.1 | <2.3 | <2.3 | <2.4 |
| T2 Toxin | <200 | <210 | <230 | <230 | <240 |
| Zearaleone | <20 | <21 | <23 | <23 | <24 | nd = not done

Amino acid composition.

TABLE 6

| | Fermentation No. - Sample No. | | |
|---|---|---|---|
| Amino acid (%) | 1-1 | 2-2 | 3-1 |
| Methionine | 0.56 | 0.52 | 0.54 |
| Lysine | 1.92 | 2.06 | 2.07 |
| Cysteine | 0.44 | 0.35 | 0.36 |
| Asparagine (acid) | 2.99 | 2.55 | 2.51 |
| Threonine | 1.52 | 1.39 | 1.44 |
| Leucine | 2.15 | 2.10 | 2.17 |
| Isoleucine | 1.38 | 1.42 | 1.44 |
| Serine | 1.50 | 1.25 | 1.31 |
| Glutamine | 3.20 | 2.69 | 2.87 |
| Glycine | 1.25 | 1.13 | 1.24 |
| Alanine | 1.55 | 1.49 | 1.65 |
| Valine | 1.67 | 1.75 | 1.70 |
| Tyrosine | 1.13 | 1.06 | 1.12 |
| Phenylalanine | 1.34 | 1.23 | 1.36 |
| Histidine | 0.67 | 0.61 | 0.68 |
| Arginine | 1.36 | 1.04 | 1.14 |
| Praline | 1.04 | 0.83 | 0.97 |
| Tryptophan | 0.44 | 0.43 | 0.46 |

Example 8B

Dried Biomass

The remaining cut particulate biomass for Example 8A was dried in portions or 30–50 kg in a Aeromatic T4 fluid bed dryer with a bottom plate area of 0.26 m² by means of dry air of a temperature of from 55–65° C. Drying terminated at a bed temperature of 38–40° C. Samples of the dried biomass had the following dry matter contents (Table 8).

TABLE 7

| Fermentation No. | Sample No. | dry matter content (%) |
|---|---|---|
| 2 | 2 | 93.2 |
| 3 | 1 | 95.5 |

Examples 9A, 9B and 9C

Sheeting, Layering, Rolling

The filter cake from Example 8A was milled and crumbled in portions of approximately 25 kg by a Lödige high shear mixer for 5 minutes. To the crumbled cake 1 kg of egg albumin (Example 9A) was added and the mixture kneaded. The procedure was repeated with a little water and spices being first mixed with the egg albumin (Example 9B).

The mixture was formed into sheets of 1 mm by rolling equipment.

The sheets were heated to 80° C. in an ventilated oven or tunnel. The sheets were layered and rolled in the form of a "Swiss roll" and the roll frozen to −20° C. using liquid carbon dioxide.

The same procedure was repeated except 1 kg pectin (Example 9C) was substituted for the egg albumin.

Examples 10A to D

Burgers

To the biomass from Examples SA and 8B colouring additives, taste enhancing products (spices, vegetables and onions) were added. The mixture was then homogenised in a kneader and the homogenised mixture formed into burgers, pasteurised and packed. Both procedures were repeated with egg albumin being first mixed with the taste enhancers.

Examples 11A to D

Sausages

To the biomass from Examples SA and B colour additives, spices, vegetables (onions) were added. The mixture was homogenised in a kneader. The homogenised mixture was extruded into a continuous tube (so that it formed the interior of the sausages) while co-extruding a (vegetarian) skin-forming material using a continuous sausage-making system (Stork) to make sausages. The two procedures were repeated with egg albumin being first mixed with the colour additives and spices.

Examples 12A and B

Granules

The filter cake from Example 8A was milled and crumbled into portions of approximately 25 kg by a Lödige high shear mixer for 5 minutes. To the crumbled cake 1 kg of egg albumin was added and the mixture kneaded. The kneaded mixture was extruded with a single screw extruder with a dieplate with holes of 1 mm. The extrudate was transported by a belt and dried in a fluidised bed drier (air temperature of 50° C.) to form granules. For Example 12B pectin was used in the same amount instead of egg albumin.

Examples 13A to D

Burgers

A batch of 25 kg of the dried extrudate from each of Examples 12A and B was mixed with 60 kg tap water. To this mixture the food additives used in Example 10 (both with and without egg albumin) were added and the mixture kneaded and formed into burgers, pasteurised, packed and frozen.

Examples 14A to D

Sausages

A batch of 25 kg of the dried extrudate from each of Examples 12A and 12B was mixed with 60 kg tap water. To the mixture the food additives from Example 11 (both with and without egg albumin) were added and the mixture processed into sausages as described in Example 11.

Examples 15A and B

Burgers

To biomass 25 kg from each of Examples 8A and B was added colour additives and taste enhancing products (spices, vegetables, onions). To the mixture 1 kg vegetable fibres (cellulose fibres with an average fibre length of 300–1000 µm) was added and homogenised in a kneader. The homogenised mixture was formed into burgers, packed, pasteurised and frozen.

Examples 16A and B

Sausages

To biomass (25 kg) from each of Examples 8A and B colour additives, spices, vegetables and onions were added. To the resulting mixture 1 kg vegetable fibres (cellulose fibres with an average fibre length of 300–1000 µm) was added and the mixture homogenised in a kneader. The homogenised mixture was formed by extrusion into sausages by co-extrusion with a vegetarian skin as described in Example 11.

Examples 17A and B

Granules for soups

The filter cake from Example 8A and B was milled and crumbled in portions of approximately 25 kg by a Lödige high shear mixer for 5 minutes. To the crumbled cake a mixture of 1 kg egg albumin was added and 1 kg vegetable fibres (cellulose fibres with an average fibre length of 300–1000 µm). The mixture was kneaded and then extruded in a single screw extruder with a dieplate with holes of 1 mm. The extrudate was transported by a belt and dried in a fluidised bed dryer (air temperature of 65 to 80° C.), to form granules. These were then added to a soup and dried to form soup powder (that produces soup on rehydration).

Examples 18A and B

Burgers

A batch of 25 kg of the dried extrudate from Examples 17A and B was mixed with 60 kg tap water. To the mixture the food additives described in Example 15 were added and the mixture kneaded and used to make burgers as described in Example 15.

Examples 19A and B

Sausages

A batch of 25 kg of the dried extrudate from Examples 17A and B was mixed with 60 kg tap water. To the mixture the ingredients as described in Example 16 were added, the mire kneaded and used to form sausages as described in Example 16.

Examples 20 to 35 and Comparative Examples 36 to 38

Patties, Sausages and Mini-Burgers

A dough was prepared by mixing and cutting the biomass prepared in Examples 4 and 5 in a lab scale food processor (Braun Combi type 700). Water and various edible ingredients (amounts given below) were added and mixed into the biomass in the food processor. The dough was placed in moulds (patties or burgers) or used to fill casings (sausages).

The shaped doughs were heated to 80° C. (internal dough temperature) either by steaming (patties), boiling in a water bath (sausages) or frying (mini burgers). The products were chilled to 4–7° C. for 2 hours and then kept for 1 week in a freezer at −20° C.

The following dough formulations were prepared (figures are in grammes).

TABLE 8

| Ingredient | Patties | Mini-burger | Sausage |
| --- | --- | --- | --- |
| biomass (25% dry weight, 75% water)* | 53 | 53 | 53 |
| water* | 35 | 35 | 35 |
| whey protein | | 2.0 | 2.0 |
| egg albumin | 6 | 2.0 | 2.0 |
| potato starch | | 1.0 | 0.5 |
| malt extract | | 0.5 | 0.2 |
| dextrose | | 0.4 | 0.5 |
| beef flavour | | 1.0 | 0.5 |
| pork flavour | | | 0.5 |
| flavours (mixture of black pepper, nutmeg, coriander and garlic powder) | | | 0.5 |
| soy oil | 4.55 | 4.55 | 5.3 |
| pectin | | 0.55 | |
| chicken flavour | 1 | | |

*NOTE: The amount of water in the biomass obtained from different fermentations varied so the ratio of dry matter: water was adjusted so that in all cases from 13–14 g dry biomass and from 39–40 g water was present.

In some cases extra pectin was added:

Patties: Mortierella, 1.5 g per 101 g dough;

Sausages: Mortierella, 1.5 g per 101 g dough; and

Burgers: Mortierella, 2.5 g per 102 g dough.

Various physical properties were noted and are shown in Tables 9 to 11. The *Rhizopus oryzae* foodstuffs were used as a baseline (hence the values are zero) and the other foodstuffs graded by comparison (+means more, −means less). For granularity, +means more granulous (i.e. less fibrous).

Patties: Examples 20 to 25

TABLE 9

| biomass | patty colour | dough | structure: granularity | juiciness | firmness |
| --- | --- | --- | --- | --- | --- |
| *Rhizopus oryzae* | cream/light brown | firm | 0 | 0 | 0 |
| *Mortierella alpina* | light brown | wet | +++ | ++ | −− |
| *Absidia Pseudocylindrospora* | dark grey | wet | +++ | ++ | −− |
| *Gilbertella persicaria* | light brown | firm | ++ | + | + |

TABLE 9-continued

| biomass | patty colour | dough | structure: granularity | juiciness | firmness |
|---|---|---|---|---|---|
| Gilbertella persicaria | light brown | firm | ++ | + | − |

Sausages: Examples 26 to 30

TABLE 10

| biomass | Sausage colour | sausage dough | structure: granularity | juiciness | firmness |
|---|---|---|---|---|---|
| Rhizopus oryzae | cream/light brown | firm | 0 | 0 | 0 |
| Mortierella alpina | light brown | wet | +++ | ++ | −−− |
| Absidia pseudocylindrospora | dark grey | wet | +++ | ++ | −− |
| Gilbertella persicaria | light brown | firm | + | + | + |
| Gilbertella persicaria | light brown | firm | + | + | + |

Mini-burgers: Examples 31 to 35

TABLE 11

| biomass | colour of the mini-burger | dough | structure: granularity | juiciness | firmness |
|---|---|---|---|---|---|
| Rhisopus oryzae | cream/light brown | firm | 0 | 0 | 0 |
| Mortierella alpina | light brown | wet | +++ | ++ | −− |
| Absidia pseudocylindrospora | dark grey | wet | +++ | ++ | −− |
| Gilbertella persicaria | light brown | firm | ++ | + | + |
| Gilbertella persicaria | light brown | firm | ++ | + | − |

As is apparent different foodstuffs with varying textures can be prepared using different organisms from the *Mucorales* group. For comparison a patty, sausage and mini-burger were prepared (Examples 36 to 38) using the same recipe above but using *Fusarium graminearum* biomass. All three products were black in colour.

The invention claimed is:

1. A process for the preparation of an edible proteinaceous substance, suitable for use in a foodstuff, comprising fungal cells, the process comprising:
   a. fermenting fungal cells of the order *Mucorales* in an aqueous liquid contained in a fermenter vessel, the liquid comprising an assimilable nitrogen (N) source and an assimilable carbon (C) source, and mixing the liquid and cells during fermentation;
   b. reducing the RNA content of the fungal cells to below 4% by weight (wt %);
   c. before or after (b), removing at least some of the water from the mixture of fungal cells and aqueous liquid; and
   d. processing the fungal cells into an edible substance.

2. A process according to claim 1, wherein the liquid and fermenter vessel are devoid of an insoluble substrate for the cells.

3. A process according to claim 1, wherein the fungal cells constitute at least 60% of the proteinaceous substance on a dry matter basis or the fungal cells constitute at least 70% of the proteinaceous substance on a dry matter basis.

4. A process according to claim 1, wherein the fungal cells are of the genus *Rhizopus* or *Gilbertella*.

5. An edible proteinaceous substance, suitable for use in a foodstuff, comprising fungal cells of the order *Mucorales* having an RNA content of below 4 wt %.

6. An edible proteinaceous substance, suitable for use in a foodstuff, comprising fungal cells of the order *Mucorales* having an RNA content of below 4 wt % which is produced by a process according to claim 1.

7. An edible substance according to claim 5 which is a biomass.

8. An edible substance according to claim 5 which is filter cake.

9. An edible substance according to claim 7, wherein the biomass is milled.

10. An edible substance according to claim 7, wherein the biomass is crumbled.

11. An edible substance according to claim 8, wherein the filter cake is milled.

12. An edible substance according to claim 8, wherein the filter cake is crumbled.

13. A process for the preparation of an edible textured product, the process comprising mixing one or more edible component(s) with an edible proteinaceous substance comprising fungal cells of the order *Mucorales* having a RNA content of below 4 wt % and mechanically texturizing the mixture.

14. A process for the preparation of an edible textured product, the process comprising mixing one or more edible component(s) with an edible proteinaceous substance comprising fungal cells of the order *Mucorales* having an RNA content of below 4 wt % and texturizing to form a product of which at least 5% is fungal cells on a dry matter weight basis.

15. A process for the preparation of an edible textured product, the process comprising mixing one or more edible components(s) with an edible proteinaceous substance comprising fungal cells of the order *Mucorales* having a RNA content of below 4 wt % and mechanically texturizing the mixture, wherein the proteinaceous substance is prepared by a process according to claim 1.

16. A process for the preparation of an edible textured product, the process comprising mixing one or more edible component(s) with an edible proteinaceous substance comprising fungal cells of the order *Mucorales* and texturizing to form product of which at least 5% is fungal cells on a dry matter weight basis, wherein the proteinaceous substance is prepared by a process according to claim 1.

17. An edible textured product, suitable for use in a foodstuff of which at least 40% is fungal cells having an RNA content of below 4 wt % of the order *Mucorales* on a dry matter weight basis.

18. A product according to claim 17 which comprises pellets, granules, a sheet, or is an extrudate, dough, roll, paste or meat-like chunk.

19. An edible textured product, suitable for use in a foodstuff, of which at least 40% is fungal cells of the order *Mucorales* on a dry matter weight basis which is produced by a process according to claim 13.

20. An edible textured product, suitable for use in a foodstuff, of which at least 40% of the textured product is fungal cells of the order *Mucorales* on a dry matter weight basis which comprises pellets, granules, a sheet, or is an extrudate, dough, roll, paste or a meat-like chunk which is produced by a process according to claim 13.

21. A process for the preparation of a foodstuff comprising forming a foodstuff with, or adding to an existing, foodstuff, an edible substance according to claim 5.

22. A process for the preparation of a foodstuff comprising
(a) preparing an edible textured product by a process comprising mixing one or more, edible component(s) with an edible proteinaceous substance comprising fungal cells of the order *Mucorales* having a RNA content of below 4 wt % and mechanically texturing the mixture, where the proteinaceous product is suitable for use in a foodstuff, and
(b) forming a foodstuff with, or adding to an existing foodstuff the textured product.

23. A process for the preparation of a foodstuff, the process comprising:
(i) preparing an edible texture product, by a process comprising mixing one or more edible proteinaceous substance comprising fungal cells of the order *Mucorales* having a RNA content of below 4 wt % and mechanically texturizing the mixture, wherein the edible proteinaceous substance is prepared by:
(a) fermenting fungal cells of the order *Mucorales* in an aqueous liquid contained in a fermenter vessel, the liquid comprising an assimilable nitrogen (N) source and an assimilable carbon (C) source, and mixing the liquid and cells during fermentation;
(b) reducing the RNA content of the fungal cells to below 4% by weight (wt %);
(c) before or after (b), removing at least some of the water from the mixture of fungal cells and aqueous liquid; and
(d) processing the fungal cells into an edible substance; and
(ii) forming a foodstuff with, or adding to an existing foodstuff, the textured product.

24. A foodstuff which comprises an edible product and one or more edible components according to claim 5.

25. A foodstuff which comprises an edible product and one or more edible components produced by a process according to claim 15.

26. A foodstuff which comprises an edible product and one or more edible components produced by a process according to claim 16.

27. A foodstuff which comprises an edible product and one or more edible components produced by a process according to claim 22.

28. A foodstuff according to claim 24 which is a sausage, patty, burger, spread, pâté, animal feed, tablet, pie, savoury snack, or oven-ready meal.

29. A foodstuff according to claim 25 which is a sausage, patty, burger, spread, pâté, animal feed, tablet, pie, savoury snack, or oven-ready meal.

30. A foodstuff according to claim 27 which is a sausage, patty, burger, spread, pâté, animal feed, tablet, pie, savoury snack, or oven-ready meal.

* * * * *

UNITED STATES PATENT AND TRADEMARK OFFICE
CERTIFICATE OF CORRECTION

| | | |
|---|---|---|
| PATENT NO. | : 7,045,160 B1 | Page 1 of 1 |
| APPLICATION NO. | : 09/720131 | |
| DATED | : May 16, 2006 | |
| INVENTOR(S) | : Andre de Haan et al. | |

It is certified that error appears in the above-identified patent and that said Letters Patent is hereby corrected as shown below:

On the title page, item (73) Assignee should read as follows:

--(73)   Assignee:   DSM IP ASSETS B.V., (TE Heerlen (NL)--

Signed and Sealed this

Twenty-second Day of May, 2007

JON W. DUDAS
*Director of the United States Patent and Trademark Office*